Dec. 2, 1969   F. A. CARLSON, JR   3,482,006
PROCESS FOR EXTRUDING A THERMOPLASTIC FOAM
Filed April 13, 1966

INVENTOR.
FRANK A. CARLSON, JR.

United States Patent Office 3,482,006
Patented Dec. 2, 1969

3,482,006
PROCESS FOR EXTRUDING A THERMOPLASTIC FOAM
Frank A. Carlson, Jr., Pittsford, N.Y., assignor to Mobil Oil Corporation, a corporation of New York
Filed Apr. 13, 1966, Ser. No. 542,387
Int. Cl. B29d 27/00, 23/04; B29h 7/20
U.S. Cl. 264—54                                    3 Claims

ABSTRACT OF THE DISCLOSURE

In a process for producing a thermoplastic foam by introducing a mixture of a normally solid thermoplastic resin and at least one cell size control additive, having a melting point lower than said resin, into a feed zone of a screw extruder disposed inside of a barrel, the surface of said barrel being maintained at a temperature above the melting point of said resin, and from which feed zone said mixture passes into a melting zone in said extruder and is subsequently extruded through a die, the improvement which comprises internally cooling said extruder screw in at least the feed zone to inhibit melting of said additive while in contact with said screw in said feed zone.

---

The present invention relates to an extrusion process which utilizes apparatus having a helical screw member to move a mass of material through a cylindrical bore or passageway of a casing member. More particularly, this invention involves an improved process which utilizes a screw member constructed in such a manner that it achieves an improved cooperation between the screw member and the mass of material being moved thereby.

Conventional apparatus having a mechanism of the rotary screw type for applying pressure and forward movement to the material being treated, in general, utilize a screw member with an external diameter which, along most of its length, is closely fitted to a passageway or cylindrical bore of the apparatus in which the screw is rotated. As in the case of the present invention the root diameter of the screw member need not be of constant diameter, for example, the root diameter of the screw may increase or decrease as the case may be in order to effect various processing conditions. For example, in the feed zone of certain commercially available extruders the root diameter is of reduced diameter in order that the feed, such as a normally solid thermoplastic resin, for example, to be heat plasticized and finally extruded may be conveniently fed into the extruder barrel. Beyond the feed zone the root diameter increases to a point where the feed material being carried forward by the rotating screw will be forced into shearing contact with the interior surface of the externally heated extruder barrel which is maintained at a temperature above the melting point of the feed resin, thereby heating, mixing and plasticating the feed mass. The external surface of the extruder barrel may be heated utilizing conventional means such as electrically heated bands or hollow jackets wherein heat exchange fluids may be circulated in order to facilitate a melting of the feed material within the extruder barrel.

In the extrusion of materials such as thermoplastics it is common practice to mix with the resin being extruded and prior to resin addition into the extruder, certain additive materials such as, for example, anti-static agents, anti-blocking agents, or in the case of thermoplastic foam extrusion, nucleating or cell size control additives, for example. This may be accomplished by either incorporating the additive material interiorly of the resin beads or by simply adhering a coating of the additive onto the surface of the resin particles. The latter method has been found to be particularly suitable when it is desired to add, for example, cell size control additives to a resin for extrusion thereof into a foam structure. Particularly in the case of polystyrene foam extrusion it has been found that the requisite cell size control additives adhere quite well to the surface of the polystyrene resin particles by simply admixing the resin and the additive in a drum tumbler or ribbon blender, for example. This admixture may then be fed into the extruder hopper section for delivery into the feed section of the extruder proper.

It has been found, in accordance with the principles of the present invention that the temperature of that portion of the extruder screw located in the vicinity of the feed section of the extruder is quite important with respect to proper functioning of the extruder and particularly with respect to uniformly feeding the additive coated resin particles forward and into contact with the interior surface of the extruder barrel for proper melting and mixing prior to extrusion thereof. In ordinary extrusion apparatus the feed portion of the extruder screw has a tendency to heat up as a result of the heat transferred from the hotter portion of the screw forward of the feed section. Attempts to remedy this by simply not heating or cooling that portion of the extruder barrel which is coextensive with the feed section of the screw have been ineffective.

As a result of such heat build-up on the feed section of the extruder screw the additive coating on the polystyrene resin which comes into contact with the screw at this point will melt and stick to the screw, admixing with polystyrene fines present in the feed mixture and accumulate and remain within the flights of the screw in the feed section where it builds up within the screw flights until the flights become completely blocked and fail, therefore, to properly feed incoming resinous material forward to the melting and mixing sections of the extruder.

Prior attempts to remedy the foregoing problems comprised, incorporation, as for example by encapsulation, of additive materials within the resin particles. However, such methods require extra processing steps to achieve additive encapsulation and additionally reduce process versatility by not allowing for rapid change of the additive materials concentration or type of additive employed without maintaining prohibitively large material inventories.

Applicant has now found an effective remedy to overcome this undesirable accumulation of additive materials on the surface of the feed section of the extruder screw. It has been found that by cooling the interior of a certain portion of the extruder screw which includes the feed section of the screw, thereby maintaining it at a sufficiently low temperature, there will be no tendency for the additive material to melt at this point and result in blocking of the screw flights of the feed portion of the extruder screw.

A more complete understanding of the process of the present invention may be had from a consideration of the following specification and the accompanying drawings in which.

Figure 1:
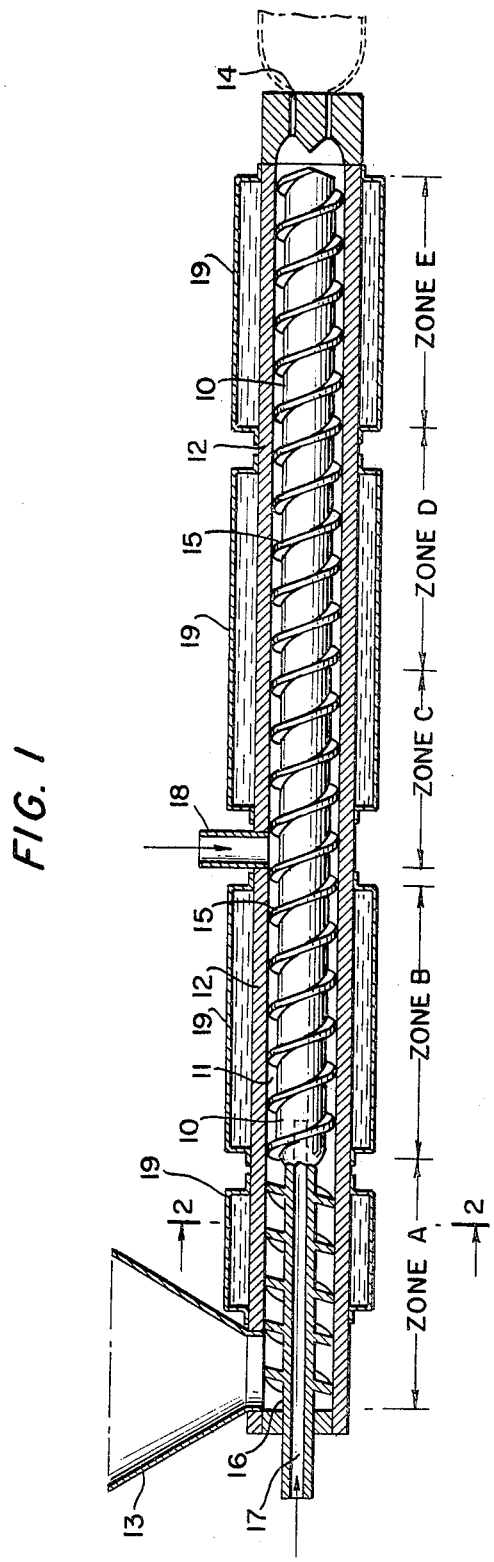
FIGURE 1 is a longitudinal sectional view of a typical or illustrative screw extruder apparatus embodying features of this invention.

One preferred embodiment of the present invention is illustrated in the figures of the drawings. In FIGURE 1 there is shown the extruder screw 10 rotatably mounted in the bore 11 of extruder barrel 12 which is provided with an inlet hopper 13 and outlet die orifice 14. The screw member 10 is provided with a substantially helical surface which comprises a series of continuous flights 15 along the length of screw member 10. The screw member is rotated by suitable means, not shown. The feed section of screw 10 as indicated in FIGURE 1 is that portion of the screw within the section lines indicated as Zone A. Also, as shown in FIGURE 1, following the feed section on Zone A of the extruder, is Zone B, the melting section; Zone C, the blowing agent injection section; Zone D, the mixing section; and Zone E, the cooling section. Located in Zone C, as illustrated in FIGURE 1, is injection port 18 which is utilized to provide an entry orifice for the blowing agent, for example liquid pentane, which is injected into the molten charge at that point. Extruder barrel 12 is provided with a series of hollow jackets 19 through which temperature control fluids may be circulated. As illustrated in FIGURE 1 the root diameter 16 of that portion of screw 10 which comprises the feed section is initially of a reduced diameter and thereafter the root diameter increases and becomes constant for a predetermined distance whereat the root diameter 16 may again vary dependent upon the desired extrusion process conditions.

Screw member 10 is provided at its forward end with an internal, longitudinally extending channel 17 which terminates at a point beyond the end of feed section A. In general, extruder feed sections are characterized as extending a length of the extruder screw which is roughly equivalent to at least one screw diameter. Thus, for example, a screw structure having a diameter of 3 inches and an $L/D$ (length to diameter) ratio of of 24:1 may have a feed section approximately 3 inches in length. For purposes of the present invention it has been found desirable to extend channel 17 internally through screw member 10 for a distance of up to 5 screw diameters and preferably for a distance of at least two screw diameters. Thus, for example, in a three inch diameter screw member internal channel 17 would extend therethrough for a distance of at least 6 inches from the forward end of screw 10.

It has been found that if cooling channel 17 is extended for much greater distances beyond 5 screw diameters, for example, 15 or 20 screw diameters or up to the full length of the screw, the extruder fails to properly forward the feed materials charged thereto as a result of some of the molten change coming into contact with the internally cooled screw surface downstream of the feed zone. This undesirably results in the molten feed freezing onto the forwarding screw flights and ultimately results in reduced extrusion output rates as well as poor product quality.

A cooling fluid, such as water, for example, is continuously circulated through channel 17 in order to maintain that portion of the surface of screw member 10 which is coextensive with internal channel 17 at a temperature below that at which melting of the additive coating carried on the resin feed material may occur. In the case of polystyrene foam extrusion a preferred cell size control additive system comprises citric acid (i.e., a mixture comprising both hydrated and anhydrous acid forms) and sodium bicarbonate. The lowest melting point member of this additive system is citric acid hydrate (M.P. −150° F.) and when employing the process and apparatus of the present invention with this particular additive system the temperature of the surface of the screw coextensive with channel 17 must be maintained at a temperature below 150° F. and preferable below 120° F.

Figure 2:
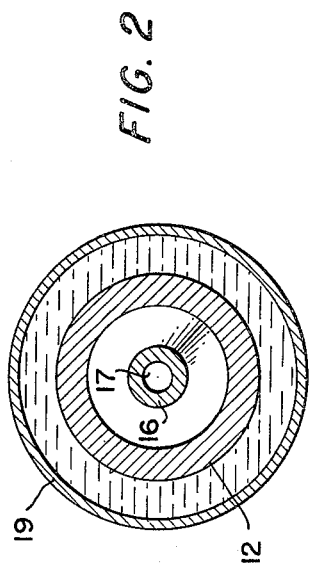
FIGURE 2 is a transverse cross-sectional view of the apparatus of FIGURE 1 taken at line 2—2.

For a more complete understanding of the present invention attention is directed to the following examples which are intended to be illustrative of certain apparatus and process embodiments of the present invention and should, therefore, not be construed as limitative thereof. The extrusion apparatus employed in the following examples was similar to the apparatus schematically illustrated in FIGURES 1 and 2 of the attached drawings.

Although the following examples relate to a direct injection foam process, i.e., one in which a blowing agent such as pentane is injected into the molten polystyrene during the course of the foam extrusion operation, it will be understood that the process and apparatus in accord with the present invention may also be employed in the extrusion of foam from foamable beads, i.e., resin particles which already have blowing agents, such as pentane, encapsulated therein. Such foamable resin particles containing blowing agent encapsulated therein may be coated with low melting point cell size control additive materials and extruded utilizing the process and apparatus of the present invention.

Example 1

Polystyrene resin pellets coated with a mixture of 0.5% sodium bicarbonate; 0.32% anhydrous citric acid; and 0.18% citric acid hydrate (percentages are weight-percent based upon the total weight of feed charged) were continuously fed into the extrusion hopper of a 3″ diameter screw extruder having an $L/D$ ratio of 24:1. The extruder was operated at an extrusion rate of 60 r.p.m. and there was no internal cooling of the screw member. By means of external extruder barrel heaters the portion of the extruder barrel surrounding the feed zone of the extruder was maintained at a temperature of about 200° F. to 250° F. In the melting zone, pentane injection zone, and the mixing zone the extruder barrel was maintained at a temperature of about 400° F. to 450° F. A liquid pentane blowing agent was injected through the extruder barrel and into the polystyrene composition at a point beyond the feed section where the polystyrene was in a molten condition. The molten mass was then passed through the extruder mixing zone and finally through the cooling section of the extruder before being finally extruded, as the final foam product, through a die orifice affixed to the terminal end of the extruder. After about 24 hours of continuous extrusion operation it become apparent, as reflected by the reduced extruder output rate, that the extruder screw was failing to uniformly feed material through the extruder barrel to the die. After termination of the extrusion process and an inspection of the feed portion of the extruder screw it was noted that the screw flights in this area were completely filled and blocked with a mass of material which upon analysis proved to be a mixture of citric acid and polystyrene fines.

Example 2

Polystyrene resin pellets coated with a mixture of 0.5% sodium bicarbonate; 0.32% anhydrous citric acid; and 0.18% citric acid hydrate (percentages are weight-percent based upon the total weight of the feed charged) were continuously fed into the extrusion hopper of the extrusion apparatus employed in Example 1, i.e., a 3″ diameter screw extruder having a 24:1 $L/D$ ratio. The extruder was operated at 60 r.p.m. Water, at approximately 50° F., was continuously circulated interiorly of the extruder screw through a hollow channel extending from the forward end thereof and for a distance of about 6″ whereby the surface of the extruder screw, coextensive with the internally circulated cooling water was maintained at a temperature below 100° F. By means of external extruder barrel heaters the portion of the extruder barrel surrounding the feed zone of the extruder was maintained at a temperature of about 200° F. to 250° F. In the melting zone; injection zone and the mixing zone the extruder barrel was maintained at a temperature of about 400° F. to 450° F. A liquid pentane blowing agent was introduced through the extruder barrel and into the polystyrene composition at a point beyond the feed zone where the polystyrene was in a molten condition. The molten mass was then passed through the extruder mixing zone and finally through the cooling zone of the extruder before finally being extruded as a foam product through a die affixed to the terminal end of the extruder. The extrusion operation continued for a period of over 1000 hours without any signs of non-uniform feeding of the molten polystyrene mass within the extruder or reduction in output extrusion rates. The foam product produced was of an exceptionally high quality polystyrene foam material. An inspection of the feed section of the extruder screw at the termination of the extrusion operation revealed that the flight portions of the screw were completely free of the material which was collected therein during the course of the extrusion operation described in Example 1.

Thus, as apparent from the foregoing examples, the apparatus and process of the present invention provide an easily adaptable method for the continuous production of thermoplastic foam from admixtures of thermoplastic resin with relatively low melting point additive materials, whereby non-uniform extruder feed problems and reduced output rates have been eliminated resulting in the production of a highly uniform polystyrene foam product of excellent quality.

Although the present invention has been described with preferred embodiments, it is to be understood that modifications and variations may be resorted to, without departing from the spirit and scope of this invention, as those skilled in the art will readily understand. Such variations and modifications are considered to be in the purview and scope of this invention.

What is claimed is:

1. In a process for producing a thermoplastic foam by introducing a mixture of a normally solid thermoplastic resin and at least one cell size control additive externally coating the surface of said solid thermoplastic resin, said additive having a melting point lower than said resin, into a feed zone of a screw extruder disposed inside of a barrel, the surface of said barrel being maintained at a temperature above the melting point of said resin, and from which feed zone said mixture passes into a melting zone in said extruder and is subsequently extruded through a die, the improvement which comprises internally cooling said extruder screw in at least the feed zone to inhibit melting of said additive while in contact with said screw in said feed zone.

2. The process in accordance with claim 1 wherein said thermoplastic resin is polystyrene.

3. The process in accordance with claim 1 wherein said cell size control additive comprises a mixture of sodium bicarbonate, anhydrous citric acid and citric acid hydrate.

References Cited

UNITED STATES PATENTS

| | | |
|---|---|---|
| 2,702,410 | 2/1955 | Brown. |
| 2,748,422 | 6/1956 | Brown. |
| 2,848,739 | 8/1958 | Henning. |
| 3,007,198 | 11/1961 | Colwell et al. |
| 3,310,836 | 3/1967 | Nichols. |
| 3,026,273 | 3/1962 | Engles _____ 264—53 XR |
| 3,060,512 | 10/1962 | Martin et al. |

FOREIGN PATENTS

| | | |
|---|---|---|
| 1,081,583 | 6/1954 | France. |

OTHER REFERENCES

Goldsberry, H. H.: Blow Molding Expandable Polystyrene, in Spe Journal, April, 1962, pp. 448–454.

PHILIP E. ANDERSON, Primary Examiner

U.S. Cl. X.R.

18—12, 14; 264—53, 209